(No Model.)
R. SCOTT.
WHEEL TIRE FOR VELOCIPEDES.
No. 467,984.  Patented Feb. 2, 1892.
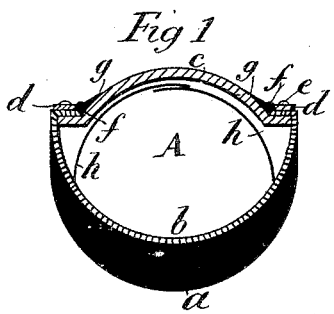
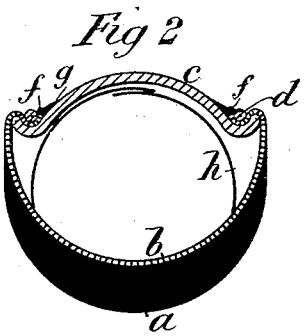
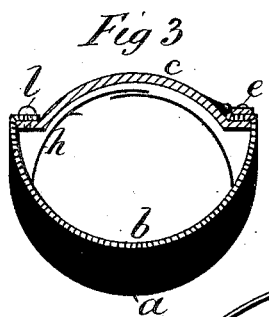
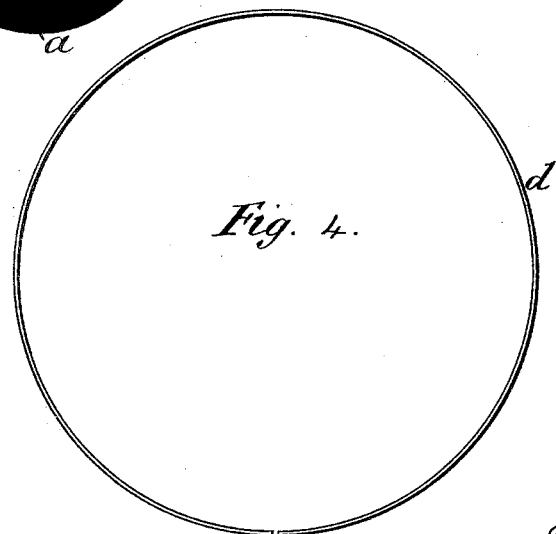
Witnesses:
C. T. Bell.
Walter Allen
Inventor.
Robert Scott.
by Herbert W. T. Jenner
Attorney.
THE NORRIS PETERS CO., PHOTO-LITHO., WASHINGTON, D. C.

UNITED STATES PATENT OFFICE.

ROBERT SCOTT, OF NEWCASTLE, ENGLAND.

WHEEL-TIRE FOR VELOCIPEDES.

SPECIFICATION forming part of Letters Patent No. 467,984, dated February 2, 1892.

Application filed July 1, 1891. Serial No. 398,125. (No model.)

*To all whom it may concern:*

Be it known that I, ROBERT SCOTT, a subject of the Queen of Great Britain and Ireland, residing at Newcastle, in the county of Northumberland, England, have invented certain new and useful Improvements in Wheel-Tires for Velocipedes and other Light Vehicles; and I do hereby declare the following to be a full, clear, and exact description of the invention, such as will enable others skilled in the art to which it appertains to make and use the same.

This invention for improvements in wheel-tires for velocipedes and other light vehicles relates to that class of tire generally known as "pneumatic," in which a hollow tube of india-rubber and canvas forming the tire is inflated with air, and has for its object to construct a tire which shall be highly resilient and all parts of which shall be easily accessible, so that in case of damage it may be readily repaired; and it consists, essentially, of a combined india-rubber and canvas ring having its edges secured to the rim of the wheel by suitable fastening devices, so as to form a hollow tubular space between the rim and the ring, into which space air is forced to inflate the tire so formed.

Referring to the accompanying sheet of illustrative drawings, Figure 1 represents a cross-section of a wheel-rim and tire constructed according to this invention, in which a ring or band $a$ of india-rubber is combined with or secured to a ring or band of canvas $b$, the edges of which lap over the edges of the wheel-rim $c$, to which they are firmly secured by the rings $d$, which are fastened to the said rim by rivets or screws $e$ to form air-tight joints, the edges of the said band being provided with beads or ridges $f$ to prevent their withdrawal from between the rings $d$ and the rim when strained, and having, also, a scarfed edge $g$, which is cemented to the rim $c$ to further insure an air-tight joint between the wheel-rim and the tire. Bands of india-rubber $h$ are attached to the interior of the tire thus formed, their free edges, which overlap each other, as clearly shown, being cemented together to form a tube A, so that as the air is forced into the cavity A and the tire inflated the said cemented bands are forced against the wheel-rim, and so further insure an air-tight joint against the rim. When the tire is damaged, the bands $h$ can be opened and access obtained to the interior of the bottom of the tire. Fig. 2 represents a cross-section of a slightly-modified arrangement, in which the edges of the wheel-rim are turned up to form recesses or grooves, over which the edges of the tire are turned and then secured by rings $d$, which are either riveted or expanded by means of a screw, as shown in Fig. 4. Fig. 3 shows in cross-section a modification of the device, in which one side of the tire is secured by a ring and screws, the same as shown in Fig. 1, and the other side by projections $l$. In each form of the device the canvas edges of the semicircular tire are bent over the edges of the felly and are secured to its under side, so that the air-tight joints are made where they are very little exposed to injury and where a large surface is obtainable for the scarfed edges $g$, which are cemented to the felly to make the joints air-tight.

What I claim as my invention, and desire to secure by Letters Patent, is—

1. The combination, with the wheel-felly, of a semicircular tire of canvas and india-rubber inclosing the edges of the felly and provided with projecting beads cemented to the felly, an internal inflatable tube, and two fastening-rings for securing the edges of the said tire against the inner periphery of the felly and forming air-tight joints, substantially as set forth.

2. The combination, with the wheel-felly provided with circumferential grooves at its inside edges, of a semicircular tire of canvas and india-rubber inclosing the edges of the felly and provided with projecting beads cemented to the felly, an internal inflatable tube, and two fastening-rings for securing the edges of the tire in the said grooves and forming air-tight joints, substantially as set forth.

In testimony whereof I affix my signature in presence of two witnesses.

ROBERT SCOTT.

Witnesses:
   FRED SMITH,
   THOS. YELLOUSLEY,
*Clerks to Messrs. Hoyle, Shipley & Hoyle, Solicitors, Newcastle-upon-Tyne.*